United States Patent
Hilberer et al.

(10) Patent No.: US 9,139,115 B2
(45) Date of Patent: Sep. 22, 2015

(54) APPARATUS FOR ACTIVATING AT LEAST ONE DRIVER'S CAB ACTUATOR ELEMENT AND/OR AT LEAST ONE SEAT ACTUATOR ELEMENT AND/OR AT LEAST ONE STEERING COLUMN ACTUATOR ELEMENT OF A COMMERCIAL VEHICLE

(75) Inventors: Eduard Hilberer, Hockenheim (DE); Bernhard Miller, Weil der Stadt (DE); Michael Herges, Munich (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 877 days.

(21) Appl. No.: 12/737,163
(22) PCT Filed: Jun. 4, 2009
(86) PCT No.: PCT/EP2009/003996
§ 371 (c)(1), (2), (4) Date: Mar. 15, 2012
(87) PCT Pub. No.: WO2009/149863
PCT Pub. Date: Dec. 17, 2009

(65) Prior Publication Data
US 2012/0173085 A1    Jul. 5, 2012

(30) Foreign Application Priority Data
Jun. 13, 2008 (DE) .......................... 10 2008 028 266

(51) Int. Cl.
  *G06F 7/00* (2006.01)
  *B60N 2/427* (2006.01)
  *B60G 17/0195* (2006.01)
  (Continued)

(52) U.S. Cl.
  CPC ........ *B60N 2/42736* (2013.01); *B60G 17/0195* (2013.01); *B60N 2/06* (2013.01); *B60N 2/4221* (2013.01); *B60N 2/4279* (2013.01); *B60R 21/0134* (2013.01); *B60W 30/085* (2013.01); *B62D 1/197* (2013.01); *B60R 2021/01252* (2013.01)

(58) Field of Classification Search
  USPC .......................... 701/36, 41, 45, 49, 300, 301
  See application file for complete search history.

(56) References Cited

U.S. PATENT DOCUMENTS

| 4,029,305 A | 6/1977 | Schubert et al. |
|---|---|---|
| 6,182,783 B1 | 2/2001 | Bayley |

(Continued)

FOREIGN PATENT DOCUMENTS

| DE | 26 32 444 | 4/1977 |
|---|---|---|
| DE | 19909432 | 9/2000 |

(Continued)

OTHER PUBLICATIONS

European Patent Office, International Preliminary Report on Patentability and Written Opinion, Dec. 23, 2010, from International Patent Application No. PCT/EP2009/003996, filed on Jun. 4, 2009.

(Continued)

*Primary Examiner* — Kim T Nguyen
(74) *Attorney, Agent, or Firm* — Kenyon & Kenyon LLP

(57) ABSTRACT

An apparatus is described for activating at least one driver's cab actuator element and/or at least one seat actuator element and/or at least one steering column actuator element of a commercial vehicle.

19 Claims, 3 Drawing Sheets

(51) Int. Cl.
  *B60N 2/06* (2006.01)
  *B60N 2/42* (2006.01)
  *B60R 21/0134* (2006.01)
  *B60W 30/085* (2012.01)
  *B62D 1/19* (2006.01)
  *B60R 21/01* (2006.01)

(56) References Cited

U.S. PATENT DOCUMENTS

| | | | |
|---|---|---|---|
| 6,224,131 B1 | 5/2001 | Shammout | |
| 6,370,461 B1 | 4/2002 | Pierce et al. | |
| 2005/0283292 A1* | 12/2005 | Kawato et al. | 701/45 |
| 2006/0190175 A1* | 8/2006 | Moriizumi et al. | 701/301 |

FOREIGN PATENT DOCUMENTS

| | | |
|---|---|---|
| DE | 101 28 141 | 1/2002 |
| DE | 100 38 362 | 2/2002 |
| DE | 10 2005 012673 | 10/2006 |
| DE | 10 2008 028 266 | 9/2009 |
| EP | 1 431 159 | 6/2004 |
| EP | 1 609 664 | 12/2005 |
| WO | 2005/085012 | 9/2005 |

OTHER PUBLICATIONS

European Patent Office, Translation of International Preliminary Report on Patentability and Written Opinion, Dec. 23, 2010, from International Patent Application No. PCT/EP2009/003996, filed on Jun. 4, 2009.

* cited by examiner

APPARATUS FOR ACTIVATING AT LEAST ONE DRIVER'S CAB ACTUATOR ELEMENT AND/OR AT LEAST ONE SEAT ACTUATOR ELEMENT AND/OR AT LEAST ONE STEERING COLUMN ACTUATOR ELEMENT OF A COMMERCIAL VEHICLE

FIELD OF THE INVENTION

The present invention relates to an apparatus for activating at least one driver's cab actuator element and/or at least one seat actuator element and/or at least one steering column actuator element of a commercial vehicle.

BACKGROUND INFORMATION

German patent document DE 10 2005 012 673 A1, for example, discusses an apparatus for activating at least one driver's cab actuator element, the control system described therein for adjusting the level of the driver's cab in relation to the vehicle frame serving to adjust the level when the vehicle is stationary or to compensate for various load states of the driver's cab or to compensate for roll and/or pitch whilst in motion. The level control system is intended to keep the driver's cab at a horizontal and constant level under all circumstances, whether stationary or in motion.

German patent document DE 26 32 444 A1 likewise discusses a driver's cab height control system, in which the driver's cab is pivotally supported about a horizontal axis in relation to the vehicle frame and is additionally supported on the vehicle frame by two pneumatic actuator elements. A height adjustment valve serves to keep the angular position of the driver's cab constant, the air pressure in the actuator elements being increased in the event of an increased load due to passengers getting in, for example, so as to prevent the rear end of the driver's cab subsiding. By contrast the air pressure in the actuator element is reduced when the load in the driver's cab falls, in order to prevent the rear of the driver's cab rising. Here too, therefore, the position of the driver's cab is adjusted to a horizontal level.

The actuator elements or support elements generally comprise pneumatic springs, which flexibly support the driver's cab relative to the vehicle frame, and generally hydraulic dampers, in order to generate damping forces between the driver's cab and the vehicle frame, which is necessary in view of the unwanted pitch and roll movements of the driver's cab caused by the flexibility of the driver's cab mounting.

SUMMARY OF THE INVENTION

Accordingly, an object of the invention is among other things to develop an apparatus for activating at least one actuator element of a commercial vehicle of the type referred to in the introduction, in such a way that an accident involving a head-on impact of the commercial vehicle will have minimal consequences for occupants of the driver's cab, in particular the driver of the commercial vehicle.

According to the invention this object may be achieved by the features described herein.

The exemplary embodiments and/or exemplary methods of the present invention relate to an apparatus for activating a) at least one driver's cab actuator element for variable adjustment of the position of a driver's cab of a commercial vehicle relative to the vehicle frame, and/or
b) at least one seat actuator element for variable adjustment of the position of at least one seat, arranged in the driver's cab for occupation by persons, relative to the driver's cab, and/or
c) at least one steering column actuator element for variable adjustment of a steering column arranged in the driver's cab relative to the driver's cab, comprising
d) a sensor device, which emits sensor signals as a function of a relative velocity and/or of a distance of the commercial vehicle from a stationary or moving obstacle, and
e) a control device, which from the sensor signals determines a potential risk of an imminent impact with the obstacle, and which if the potential risk exceeds a threshold value
f) activates the driver's cab actuator element and/or the seat actuator element and/or the steering column actuator element by way of the control device, in such a way that already before an imminent impact
g) the distance between persons in the driver's cab and the obstacle, and/or
h) the distance between the seat and the obstacle, and/or
i) the distance between an end of the steering column facing the driver and the driver is increased, compared to the previously existing position(s) of the driver's cab and/or the seat and/or the steering column.

The advantages that can be secured by the invention reside in the fact that due to the positional adjustment of the seat, the driver's cab and the steering column the space extending around the driver or a passenger in the commercial vehicle or the distance of the persons situated in the driver's cab from the obstacle is already increased prior to an impact with the obstacle, thereby reducing the probability of the driver and/or the passenger being pinned or caught by parts of the driver's cab or the obstacle in the event of an accident. Examples of a critical obstacle in a head-on collision may include an in-cutting, preceding, oncoming or stationary vehicle or some other moving or stationary obstacle, such as a structure or a tree, for example.

The combination of the sensor device, the control device and the actuator elements therefore serves to anticipate or prevent this by determining a probability or potential risk of an impact, crash or collision of the commercial vehicle with an obstacle as a function of the signals from the sensor device and, should the probability or the potential risk exceed a threshold value, using the control device to activate at least one actuator element so as to increase the survival space before the crash, impact or collision has occurred. The risk of injury to the driver or the passenger(s) in the event of a head-on collision of the commercial vehicle with an obstacle is thereby reduced.

The measures cited in the dependent claims afford advantageous developments and enhancements of the invention further specified herein.

The driver's cab actuator element for variable adjustment of the position of the driver's cab may comprise at least one hydraulically operated actuator element, which serves for the flexible support and damping of the driver's cab in relation to the vehicle frame. In this case the hydraulically operated actuator element may form part of a level control or level adjustment or a device for tilting the driver's cab in relation to the vehicle frame.

At least the one actuator element thereby has an advantageous dual function, in that for one thing it is used, for example, for the level control system or tilting of the driver's cab disclosed by the aforementioned documents, serving not only to keep the driver's cab at a constant level and in a horizontal position, or to tilt it, but also to tilt the driver's cab in order to increase the distance of the driver and the passengers from the obstacle already prior to the impact.

At least the one hydraulically operated actuator element is therefore designed particularly in such a way that the driver's cab can be set by this actuator element into a position, which viewed in the direction of travel is tilted rearward relative to a horizontal position and in which at least one front, upper edge of the driver's cab assumes a backset position, viewed in the direction of travel. This action occurs should the potential risk prior to the imminent impact of the commercial vehicle with the obstacle exceed the threshold value, to which end the hydraulically operated actuator element is activated by the control device, for example by means of at least one solenoid valve, which controls or regulates the supply and discharge of fluid to at least the one hydraulically operated actuator element.

At its front end in the direction of travel the driver's cab may be supported so that it can pivot about a horizontal tilting axis on the vehicle frame and at its rear end in the direction of travel is supported by at least the one hydraulically operated actuator element. The rearward tilted position of the driver's cab can then easily be achieved by discharging fluid from the actuator elements, the driver's cab pivoting about the pivot axis.

Alternatively or in addition at least the one driver's cab actuator element may displace the driver's cab in relation to the vehicle frame along a guide in the direction of travel, a locking device that can be controlled by the control device serving to lock the driver's cab in a specific position in relation to the vehicle frame and to release it therefrom.

Should the potential risk prior to the imminent impact of the commercial vehicle with the obstacle exceed the threshold value, at least the one driver's cab actuator element and the locking device are then activated by the control device, in such a way that the locking device is released and the driver's cab is brought into a backset position counter to the direction of travel by at least the one driver's cab actuator element.

Alternatively or in addition at least the one (driver's) seat may be linearly displaceable in relation to the driver's cab by a linear guide parallel to the direction of travel and may be locked in a specific position and released therefrom by means of a locking device. Should the potential risk prior to the imminent impact of the commercial vehicle with the obstacle exceed the threshold value, at least the one seat actuator element and the locking device are then activated by the control device, in such a way that the locking device is released and the seat is brought into a backset position counter to the direction of travel.

Alternatively or in addition the steering column of the commercial vehicle can be designed to telescopically withdraw into a downwardly retracted position or to extend into an upwardly extended position and/or to pivot about an axis of rotation or a pivot point. In particular the steering column may be adjusted by at least the one steering column actuator element to a retracted position and/or to a pivoted position forward of the driver in the direction of travel and locked in this position and released therefrom by a locking device. Should the potential risk prior to the imminent impact of the commercial vehicle with the obstacle exceed the threshold value, at least one steering column actuator element and the locking device are then activated by the control device, in such a way that the locking device is released and the steering column is adjusted to a retracted position and/or to a pivoted position forward of the driver in the direction of travel.

In addition, should the potential risk prior to the imminent impact of the commercial vehicle with the obstacle exceed the threshold value, at least one airbag, in particular a driver and/or front passenger airbag, can be made to deploy by the control device.

The sensor device may comprise sensors of an adaptive cruise control (ACC) device for controlling the distance from a preceding vehicle and/or the speed relative to the latter. Such a known speed and distance control system relies on radar sensors, for example, which determine the distance and speed of a preceding vehicle or one that is cutting in. A distance set by the driver can then be constantly maintained by means of a corresponding control algorithm. The arrangement according to the invention therefore uses the sensors of ACC systems as signal transmitters for the control device of the arrangement according to the invention, in which an algorithm is employed to estimate the risk of collision.

As an alternative or in addition the sensor device may comprise acceleration sensors, incorporated in an electronic stability system (ESP) of the commercial vehicle, for measuring at least the vehicle deceleration in the vehicle longitudinal direction. Here too, therefore, the sensors serve an advantageous dual function.

The sensor device may furthermore comprise monitoring sensors, which determine the distance of the commercial vehicle from road lane boundary markings.

At least some of the actuator elements activated by the control device may be electromagnetically operated, because these electrically controlled actuator elements are capable of acting in the necessarily short reaction time as solenoid pressure control or pressure regulating valves, for example.

Alternatively, for activation by pressure control or pressure regulating valves at least one gas cartridge, acting in a manner similar to that in airbags, may also be made to detonate, which via a cylinder-piston mechanism like a pneumatic cylinder undertakes an adjustment of the driver's cab, seat or steering column. In this case the adjusting energy and hence the rate of adjustment can be adapted through a suitable quantity of the gas propellant in proportion to the piston size. It is also possible, for example, by using multiple gas propellant charges, which are ignited together or at an interval from one another, to vary the rate of horizontal adjustment of the driver's cab and/or the driver's seat. It is thereby possible to increase the time taken for deceleration of the driver, so as to achieve a lower negative acceleration factor.

Furthermore the control device may also evaluate data generated by other control devices (engine control unit, transmission control, brake control unit, satellite navigation etc.), such as the vehicle speed, the load state, the instantaneous brake pressure, the instantaneous engine torque, and/or the instantaneous location of the commercial vehicle, for the activation of at least the one actuator element.

More specific information is set forth in the following description of exemplary embodiments.

Exemplary embodiments of the invention are represented in the drawing below and are explained in more detail in the following description.

DETAILED DESCRIPTION

Figure 1:
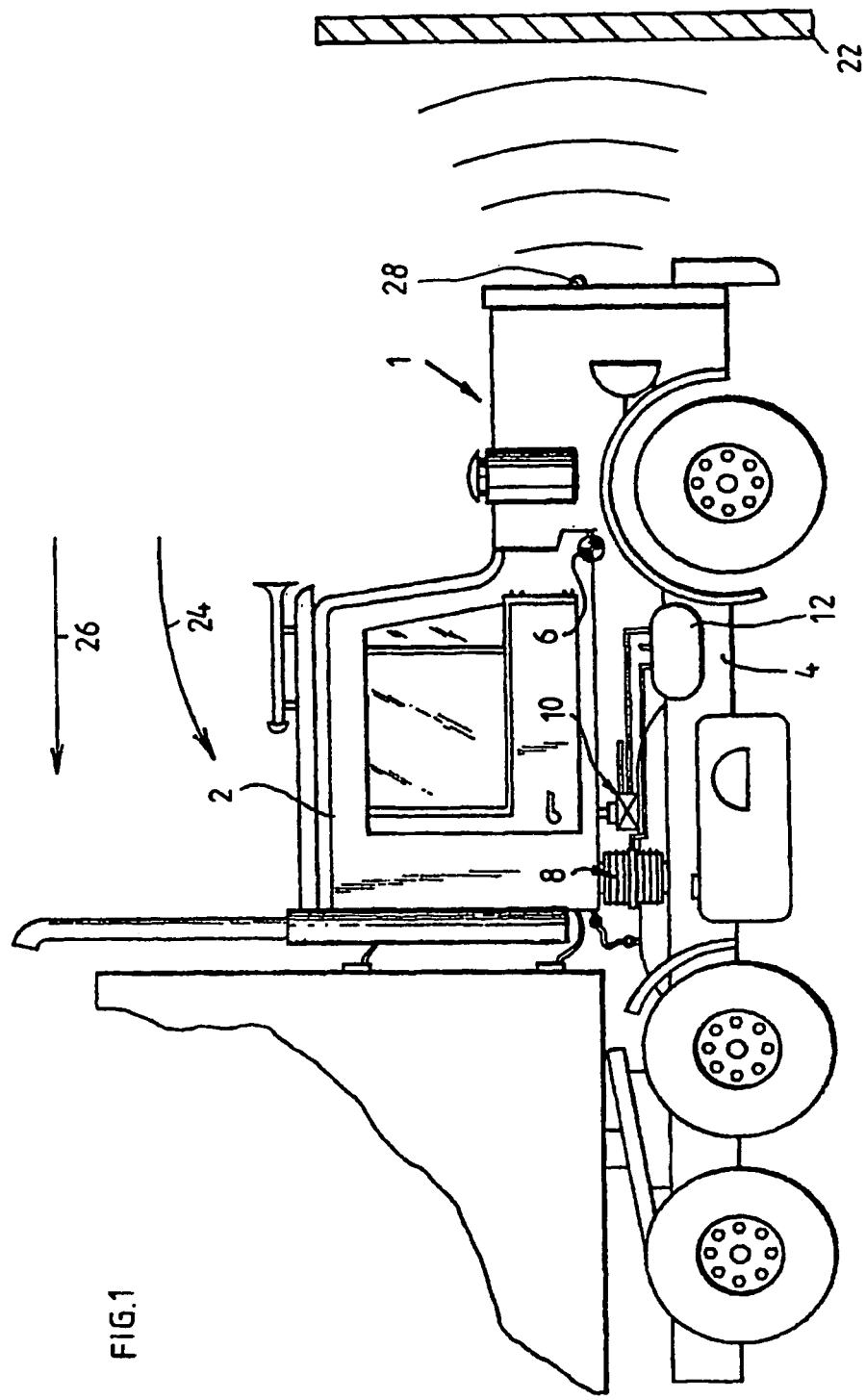
FIG. 1 shows a schematic side view of a commercial vehicle having an arrangement according to a embodiment of the present invention.

The semitrailer tractor 1, shown in FIG. 1, of a tractor-semitrailer combination comprises a driver's cab height control system, in which a driver's cab 2 is pivotally supported in relation to the vehicle frame 4 about a horizontal axis 6, which may be arranged at the front end of the driver's cab 2, and transversely to the longitudinal direction is additionally supported on the vehicle frame 4 by, for example, two preferably pneumatic and longitudinally adjustable actuator elements 8, for example in the form of pneumatic cylinder-piston drives. The pneumatic actuator elements 8 also serve, in combination with dampers, for example hydraulic dampers not shown here, for the flexible support and damping of the driver's cab 2 in relation to the vehicle frame 4.

The angular position of the driver's cab 2 in relation to the vehicle frame 4 is kept constant by a height adjustment valve 10, the air pressure in the pneumatic actuator elements 8 being increased by the height adjustment valve 10 in the event of an increased load due to passengers getting into the driver's cab 2, for example, in order to supply the actuator elements 8 with compressed air from the vehicle compressed air reservoir 12 and thereby prevent the rear end of the driver's cab 2 subsiding. By contrast the air pressure in the actuator elements 8 is reduced by venting when the load in the driver's cab 2 falls, in order to prevent the rear end of the driver's cab 2 rising. The position of the driver's cab 2 is thereby adjusted to a horizontal level. Instead of a height adjustment valve 10, the height may also be adjusted by an electrical height sensor, for example a potentiometer, which as a function of the vertical position of the driver's cab 2 delivers an electrical signal to an electronic control unit, which as a function of the sensor signal activates an actuator, in the form of a solenoid valve, for example, in order to increase or reduce the air pressure in the actuator elements.

The commercial vehicle also comprises an apparatus for activating a) the two pneumatic driver's cab actuator elements 8 for variable adjustment of the position of the driver's cab 2 relative to the vehicle frame 4, and/or
b) at least one seat actuator element 14 for variable adjustment of the position of at least one seat, arranged in the driver's cab for occupation by persons, relative to the driver's cab 2, and/or
c) at least one steering column actuator element 16 for variable adjustment of a steering column arranged in the driver's cab 2 relative to the driver's cab 2, comprising
d) a sensor device 18, which emits sensor signals as a function of a relative velocity and/or of a distance of the commercial vehicle from a stationary or moving obstacle 22, and
e) a control device 20, which from the sensor signals determines a potential risk of an imminent impact with the obstacle 22, and which if the potential risk exceeds a threshold value
f) activates the driver's cab actuator element 8 and/or the seat actuator element 14 and/or the steering column actuator element 16 by way of the control device 20, in such a way that already before an imminent impact
g) the distance between persons in the driver's cab 2 and the obstacle 22, and/or
h) the distance between the seat and the obstacle 22, and/or
i) the distance between an end of the steering column facing the driver and the driver is increased, compared to the previously existing position(s) of the driver's cab 2 and/or the seat and/or the steering column.

The predefined threshold value for the potential risk can be determined experimentally, for example. Empirical or experimental values for the longitudinal deceleration of the commercial vehicle 1, the distance and/or the relative velocity in relation to the obstacle 22 and other input signals from sensors here exert a influence on the magnitude of the potential risk. The control device 20 contains routines which calculate or estimate the potential risk as a function of the sensor signals of the sensor device 18.

Driver's cab actuator elements for variable adjustment of the position of the driver's cab 2 may be provided in the form of two pneumatic actuator elements 8 of the existing level control system of the driver's cab 2. In particular these pneumatic actuator elements 8 are designed in such a way that the driver's cab 2 can be set by these actuator elements 8 into a position, which viewed in the direction of travel is tilted rearward relative to a horizontal position shown in FIG. 1, and in which a front, upper edge of the driver's cab assumes a backset position, viewed in the direction of travel, as can be readily appreciated from the arrow 24 in FIG. 1. In the backset or tilted position of the driver's cab 2 the pneumatic actuator elements 8 are therefore shortened compared to the situation in FIG. 1. At the same time the driver's cab 2 is pivoted about the axis 6.

Tilting of the driver's cab 2 about the axis 6 occurs should the potential risk prior to the imminent impact of the commercial vehicle 1 with the obstacle 22 exceed the threshold value, to which end the pneumatic actuator elements 8 are activated by the control device 20, for example by means of at least one solenoid valve (not shown here), which controls or regulates the supply and discharge of compressed air to and from the pneumatic actuator elements 8. Since the axis 6 is generally located below the persons present in the driver's cab 2 and there is therefore a vertical and/or horizontal distance between the seats in the driver's cab and the axis 6, the tilting of the driver's cab 2 increases the distance at least between the head area of the persons and the obstacle 22, owing to the lever arm existing between the persons in the driver's cab 2 and the axis 6, as can readily be appreciated from FIG. 1.

Instead of support about an axis 6, the driver's cab 2 could also be supported in its front area by way of further hydraulically operated actuator elements on the vehicle frame 4, which could then assist the rearward tilting by extending.

Alternatively or in addition at least one driver's cab actuator element (not shown here) may be provided, which serves to displace the driver's cab 2 linearly in relation to the vehicle frame 4 parallel to the direction of travel along a guide (not shown), a locking device that can be controlled by the control device 20 serving to lock the driver's cab 2 in a specific position in relation to the vehicle frame 4 and release it therefrom. Should the potential risk prior to the imminent impact of the commercial vehicle 1 with the obstacle 22 exceed the threshold value, at least the one driver's cab actuator element and the locking device are then activated by the control device 20, in such a way that the locking device is released and the driver's cab 2 is brought into a backset position counter to the direction of travel by at least the one driver's cab actuator element, as is indicated by the further arrow 26 in FIG. 1.

Figure 2:
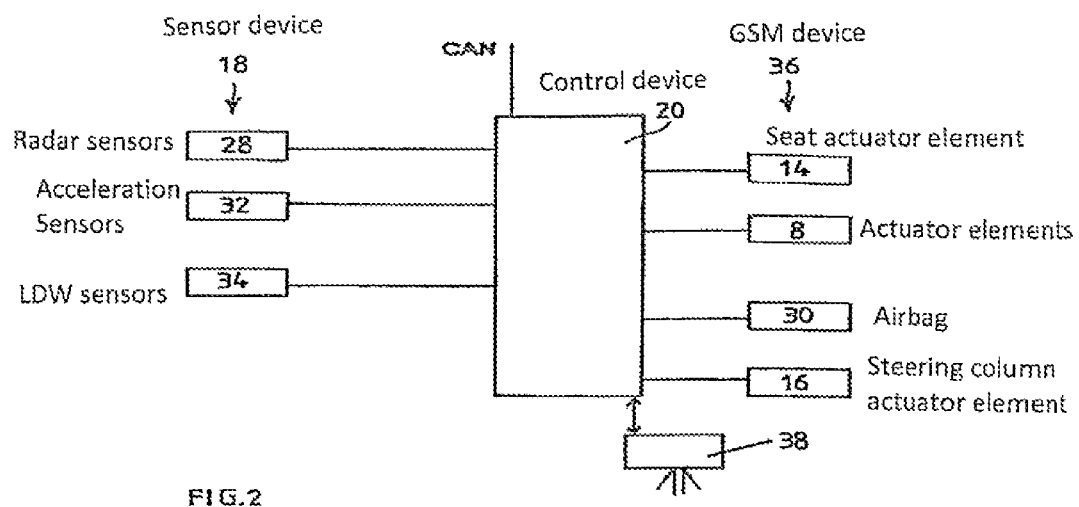
FIG. 2 shows a schematic circuit diagram of the arrangement in FIG. 1.

Alternatively or in addition, at least the one (driver's) seat may be linearly displaceable in relation to the driver's cab 2 by a linear guide parallel to the direction of travel and may be locked in a specific position and released therefrom by means of a locking device as is indicated schematically, particularly in FIG. 2. Should the potential risk prior to the imminent impact of the commercial vehicle 1 with the obstacle 22 exceed the threshold value, at least the one seat actuator element 14 and the locking device are then activated by the control device 20, in such a way that the locking device is released and the seat is brought into a backset position counter to the direction of travel.

Alternatively or in addition the steering column of the commercial vehicle can be designed to telescopically withdraw into a downwardly retracted position or to extend into an upwardly extended position and/or to pivot about an axis of rotation or a pivot point. In particular the steering column can be adjusted by at least the one steering column actuator element 16 to a retracted position and/or to a pivoted position forward of the driver in the direction of travel and locked in this position by a locking device. Should the potential risk prior to the imminent impact of the commercial vehicle 1 with the obstacle 22 exceed the threshold value, at least one steering column actuator element 16 and the locking device are then activated by the control device 20, in such a way that the locking device is released and the steering column is adjusted to a retracted position and/or to a pivoted position forward of the driver in the direction of travel.

In addition, should the potential risk prior to the imminent impact of the commercial vehicle 1 with the obstacle 22 exceed the threshold value, at least one airbag 30, in particular a driver and/or front passenger airbag, can be made to deploy by the control device 20.

The sensor device 18 may comprise sensors of an adaptive cruise control (ACC) device for controlling the distance from a preceding vehicle and/or the speed relative to the latter. Such a known ACC speed and distance control system relies on radar sensors 28, for example, which determine the distance and speed of a preceding vehicle or one that is cutting in. A distance set by the driver can then be constantly maintained by means of a corresponding control algorithm. The arrangement according to the exemplary embodiments and/or exemplary methods of the present invention therefore may use the existing sensors 28 on ACC systems as signal transmitters for the control device 20 of the arrangement according to the invention, in which an algorithm is employed to estimate the risk of collision.

As an alternative or in addition the sensor device 18 may comprise acceleration sensors 32, incorporated in an electronic stability system (ESP) of the commercial vehicle, for measuring at least the vehicle deceleration in the vehicle longitudinal direction. Here too, therefore, the sensors serve an advantageous dual function.

As an alternative or in addition the sensor device may comprise lane distance warning (LDW) sensors 34, which determine the distance of the commercial vehicle 1 from road lane boundary markings.

Furthermore the control device 20 may also evaluate data generated by other control devices (engine control unit, transmission control, brake control unit, satellite navigation etc.), such as the vehicle speed, the load state, the instantaneous brake pressure, the instantaneous engine torque, the gear currently engaged, the status of the clutch (open/closed) and/or the instantaneous location of the commercial vehicle (for example via satellite navigation) for the activation of at least the one actuator element 8, 14, 16, 30. These data or signals may be relayed to the control device 20 via a vehicle data bus (CAN), as shown in FIG. 2.

The sensors 18 and the actuator elements 36 may communicate with the electronic control device 20 and this control device 20 may communicate with control units of other vehicle systems such as the engine control, the brake control or the transmission control, for example, and/or with other sensors through the vehicle CAN.

In addition the control device 20 may interact with a GSM device 36 in the form of a GSM control unit, a GSM sensor and a GSM transmitter device, for automatically informing authorities such as the police or fire brigade in the event of an accident, should the control device 20, from the sensor signals, detect a potential risk of an imminent impact with the obstacle 22 which exceeds a predefined threshold value.

The obstacle 22 may be a stationary obstacle 22, as is indicated in FIG. 1, or a moving obstacle, such as a preceding vehicle travelling at a slower speed, an oncoming vehicle or an in-cutting vehicle.

Figure 3:
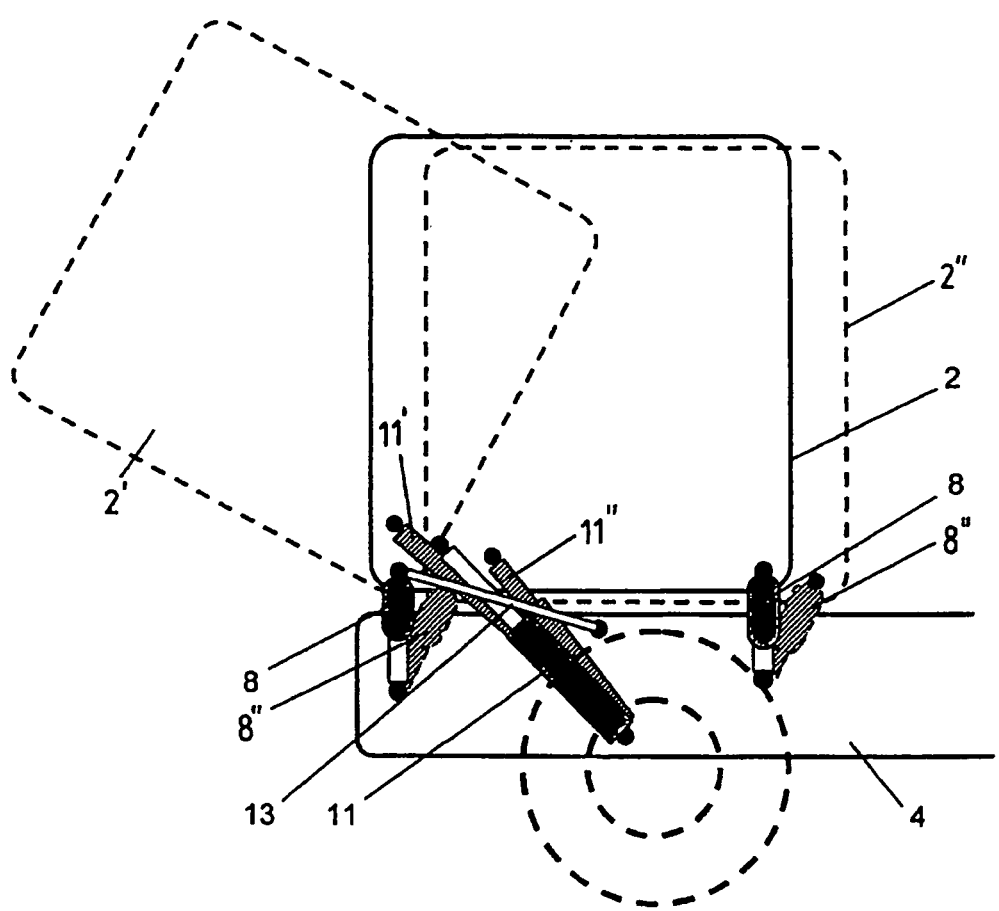
FIG. 3 shows a schematic side view of a driver's cab having an arrangement according to a further embodiment of the present invention.

In the further exemplary embodiment shown in FIG. 3 the driver's cab 2 is supported on the vehicle frame by combined air-spring bellows-damping elements 8, again in the form, for example, of pneumatic cylinder-piston drives, as part of a level control system of the driver's cab 2. These air-spring bellows-damping elements 8 may each be pivotally supported at either end, that is on the vehicle frame 4 on the one hand and on the driver's cab 2 on the other.

On the other hand at least one hydraulic cylinder, for example a double-acting hydraulic cylinder 11 (acting in tension and compression), which is pivotally supported on the driver's cab 2 on the one hand and on the vehicle frame 4 on the other, is provided as actuator element for the horizontal displacement and tilting of the driver's cab 2 in relation to the vehicle frame 4. One such hydraulic cylinder 11 is provided on each side of the driver's cab, for example. The hydraulic cylinder 11 is eccentrically articulated on the driver's cab 2, that is to say at a horizontal interval from the articulation of the front air spring bellows-damping elements 8.

A guide linkage 13, which on the one hand is articulated on the driver's cab 2 at a point of articulation of each front air spring bellows-damping element 8 and on the other is articulated in an inclined position on the vehicle frame 4, is provided for the driver's cab 2. The guide linkage 13 is adjustable in length and can be locked in the set position, said linkage being adjusted to a fixed length and locked during the tilting of the driver's cab 2 into a forward position 2', for example for the purpose of carrying out servicing on the engine located on the vehicle frame 4 beneath the driver's cab 2.

For tilting the driver's cab 2 into the forward position 2' the hydraulic cylinders 11 then act in their pressure stage and extend into the position 11', the driver's cab 2 released in relation to the rear air spring bellows-damping elements 8 swiveling about the points of articulation of the front air spring bellows-damping elements 8 into the position 2', as shown in FIG. 3. The guide linkage 13 adjusted to a specific length and locked then keeps these forward air spring bellows-damping elements 8 each forming pivot bearings in position.

In this exemplary embodiment the hydraulic cylinders 11 serving as driver's cab actuator elements are activated by the control device 20 should the potential risk prior to the imminent impact of the commercial vehicle 1 with the obstacle 22 exceed the threshold value, in such a way that the driver's cab 2 is brought by the hydraulic cylinder 11 into a backset position 2" counter to the direction of travel, as is indicated in FIG. 3. This displacement of the driver's cab 2 into the position 2" comes about due to a shortening of the hydraulic cylinders 11, that is to say the then shortened hydraulic cylinders 11" act in the tension direction. The guide linkage 13 released by the control device 20 is likewise shortened.

The air spring bellows-damping elements 8 do not contribute to this horizontal displacement and here merely pivot like a parallelogram rearwards about their points of articulation on the vehicle frame 4 into the position 8'''.

The List of reference numerals is as follows:
1 semitrailer tractor
2 driver's cab
3 driver's cab in horizontally adjusted position
4 vehicle frame
6 axis
8 actuator elements (air spring bellows, damper)
10 height adjustment valve 11 double-acting hydraulic cylinder
12 compressed air reservoir
13 variable-length guide linkage
14 seat actuator element
16 steering column actuator element
18 sensor device
20 control device
22 obstacle
24 arrow
26 arrow
28 radar sensors
30 airbag
32 acceleration sensors
34 LDW sensors
35 actuator elements
36 GSM device

The invention claimed is:

1. An apparatus for activating an element, comprising:
a sensor device, which emits sensor signals as a function of at least one of a relative velocity and of a distance of a commercial vehicle from an obstacle, which is a stationary obstacle or a moving obstacle, wherein the element includes (a) at least one driver's cab actuator element for variably adjusting a position of a driver's cab of the commercial vehicle relative to a vehicle frame, (b) at least one seat actuator element for variably adjusting a position of at least one seat, arranged in the driver's cab for occupation by persons, relative to the driver's cab, and (c) at least one steering column actuator element for variably adjusting a steering column arranged in the driver's cab relative to the driver's cab; and
a control device, which from the sensor signals, determines a potential risk of an imminent impact with the obstacle, and which, if the potential risk exceeds a threshold value, activates at least one of the driver's cab actuator element, the seat actuator element, and the steering column actuator element via the control device, so that before an imminent impact, at least one of a distance between the persons in the driver's cab and the obstacle, a distance between the seat and the obstacle, and a distance between an end of the steering column facing a driver and the driver is increased, compared to a previously existing position of the at least one of the driver's cab, the seat, and the steering column;
wherein the at least one driver's cab actuator element includes a controlling actuator element which forms part of a level control or level adjustment or a device for tilting the driver's cab in relation to the vehicle frame.

2. The apparatus of claim 1, wherein at least one of the driver's cab actuator element, the seat actuator element, and the steering column actuator element includes at least one detonatable gas cartridge, which directly or indirectly adjusts the driver's cab, the seat or the steering column.

3. The apparatus of claim 1, wherein the controlling actuator element of the at least one driver's cab actuator element includes a hydraulically operated actuator element which forms part of the level control or level adjustment or the device for tilting the driver's cab in relation to the vehicle frame.

4. The apparatus of claim 3, wherein the hydraulically operated actuator element is configured so that the driver's cab can be set into a position, which viewed in a direction of travel is at least one of tilted and backset relative to a horizontal position and in which at least one front, upper edge of the driver's cab assumes a backset position, viewed in the direction of travel.

5. The apparatus of claim 1, wherein should the potential risk prior to the imminent impact of the commercial vehicle with the obstacle exceed the threshold value, at least the one hydraulically operated actuator element is activated by the control device, so that the driver's cab is brought into at least one of a rearward tilted and the backset position.

6. The apparatus of claim 5, wherein the driver's cab is supported at its front end in the direction of travel so that it is pivotable about a horizontal tilting axis on the vehicle frame and at its rear end in the direction of travel is vertically supported by the hydraulically operated actuator element.

7. The apparatus of claim 1, wherein the driver's cab is displace-able or pivot-able in relation to the vehicle frame along a guide in the direction of travel by the driver's cab actuator element, and wherein the driver's cab is lockable in a specific position in relation to the vehicle frame and released therefrom by a locking device that is controllable by the control device.

8. The apparatus of claim 7, wherein should the potential risk prior to the imminent impact of the commercial vehicle with the obstacle exceed the threshold value, at least the one driver's cab actuator element and the locking device is activate-able by the control device, so that the locking device is released and the driver's cab is brought into a backset position counter to the direction of travel by at least the one driver's cab actuator element.

9. The apparatus of claim 1, wherein the seat is displaceable along a guide in relation to the driver's cab parallel to the direction of travel and is lockable in a specific position and release-able therefrom by a locking device.

10. The apparatus of claim 9, wherein should the potential risk prior to the imminent impact of the commercial vehicle with the obstacle exceed the threshold value, at least the one seat actuator element and the locking device are activated by the control device, so that the locking device is released and the seat is brought into a backset position counter to the direction of travel.

11. The apparatus of claim 1, wherein the steering column is telescopically withdrawable into a downwardly retracted position or extendable into an upwardly extended position and/or to pivot about an axis of rotation or a pivot point.

12. The apparatus of claim 11, wherein the steering column is adjustable by the steering column actuator element to a retracted position and/or to a pivoted position forward of the driver in the direction of travel and lockable in this position and release-able therefrom by a locking device.

13. The apparatus of claim 12, wherein should the potential risk prior to the imminent impact of the commercial vehicle with the obstacle exceed the threshold value, at least the one steering column actuator element and the locking device are activated by the control device, so that the locking device is released and the steering column is adjusted to at least one of the retracted position and the pivoted position forward of the driver in the direction of travel.

14. The apparatus of claim 1, wherein should the potential risk prior to the imminent impact of the commercial vehicle with the obstacle exceed the threshold value, at least one airbag is made to deploy by the control device.

15. The apparatus of claim 1, wherein the sensor device includes sensors of an adaptive cruise control (ACC) device for controlling the distance from a preceding vehicle and/or a speed relative to the preceding vehicle.

16. The apparatus of claim 1, wherein the sensor device includes acceleration sensors incorporated in an electronic stability system (ESP) of the commercial vehicle for measuring at least a vehicle deceleration in a vehicle longitudinal direction.

17. The apparatus of claim 1, wherein the sensor device includes monitoring sensors, which determine the distance of the commercial vehicle from road lane boundary markings.

18. The apparatus of claim 1, wherein at least one of the actuator elements activated by the control device are electromagnetically operated.

19. The apparatus of claim 1, wherein the control device also evaluates data generated by other control devices, including at least one of a vehicle speed, a load state, an instantaneous brake pressure, an instantaneous engine torque, a status of a clutch, whether a gear is currently engaged, and an instantaneous location of the commercial vehicle for the activation of at least one of the actuator elements.

* * * * *